United States Patent [19]
Litwin et al.

[11] Patent Number: 6,056,805
[45] Date of Patent: May 2, 2000

[54] METHOD AND APPARATUS FOR THE ABSORPTION OF NON-POLAR ORGANIC MOLECULES ON HYDROCARBON BLOCK COPOLYMERS

[75] Inventors: William S. Litwin, Kent; James McKeon, New Fairfield, both of Conn.

[73] Assignee: Guardian Environmental Technologies, Inc., Kent, Conn.

[21] Appl. No.: 09/135,062

[22] Filed: Aug. 13, 1998

Related U.S. Application Data

[60] Provisional application No. 60/055,857, Aug. 15, 1997.

[51] Int. Cl.[7] .................................................. B01D 53/04
[52] U.S. Cl. ................................. 95/143; 96/153; 96/154; 210/263; 210/660
[58] Field of Search .............................. 96/153, 154, 108, 96/143, 144; 95/143, 144, 145, 146, 141, 142; 210/502.1, 263, 660, 671, 680, 692, 693, 694

[56] References Cited

U.S. PATENT DOCUMENTS

| | | | |
|---|---|---|---|
| 3,366,582 | 1/1968 | Adams et al. | 96/153 |
| 3,629,998 | 12/1971 | Takehisa | 95/143 |
| 3,686,827 | 8/1972 | Haigh et al. | 95/143 |
| 3,798,876 | 3/1974 | Kennedy | 95/143 |
| 3,805,493 | 4/1974 | Kennedy et al. | 95/143 |
| 3,960,762 | 6/1976 | Kroebel et al. | 252/426 |
| 3,966,597 | 6/1976 | Omori et al. | 210/39 |
| 4,728,343 | 3/1988 | Snyder | 95/143 |
| 5,288,307 | 2/1994 | Goltz et al. | 95/143 |
| 5,348,929 | 9/1994 | Ito et al. | 95/146 |
| 5,374,600 | 12/1994 | Hozumi et al. | 502/402 |
| 5,393,329 | 2/1995 | Inagaki et al. | 95/146 |
| 5,529,609 | 6/1996 | Gooch et al. | 96/153 |
| 5,560,929 | 10/1996 | Hedstrand et al. | 424/486 |
| 5,595,586 | 1/1997 | Sivavec | 95/146 |
| 5,641,847 | 6/1997 | Hozumi et al. | 526/328.5 |
| 5,700,310 | 12/1997 | Bowman et al. | 95/143 |

*Primary Examiner*—Duane S. Smith
*Attorney, Agent, or Firm*—William R. Moran

[57] ABSTRACT

A method and apparatus are provided for the separation of non-polar organic molecules from fluids which utilize certain hydrocarbon block copolymers having soft and hard segments as absorbents. By employing hydrocarbon block copolymer having a particular concentration of soft and hard segments, optimum absortion is achieved while maintaining the mechanical structure of the absorbent so that it can withstand high fluid flow rates.

20 Claims, No Drawings

METHOD AND APPARATUS FOR THE ABSORPTION OF NON-POLAR ORGANIC MOLECULES ON HYDROCARBON BLOCK COPOLYMERS

RELATED APPLICATIONS

This application bases its priority on provisional application Ser. No. 60/055,857, filed Aug. 15, 1997, the contents of which is incorporated herein by reference.

BACKGROUND OF THE INVENTION

1. Field of the Invention

This invention related in general to the absorption of certain organic molecules in hydrocarbon block copolymers. In one aspect, this invention is directed to a method for the absorption of hydrocarbons, chlorocarbons and other non-polar molecules in certain hydrocarbon block copolymers. In another aspect this invention is directed to environmentally beneficial separation and/or recovery systems which utilize hydrocarbon block copolymers as absorbents for hydrocarbons, chlorocarbons and other non-polar organic molecules. In a further aspect, the invention is directed to an apparatus which utilizes hydrocarbon block copolymers for the absorption of such molecules.

2. Background Art

A wide variety of materials have been employed in recent years as absorbents for various chemicals, gases, toxic wastes, and the like. In view of the trend towards an environmentally safe atmosphere, continous efforts are being expended to provide processes and equipment for the entrapment, separation, recovery and safe disposition of chemicals and toxic substances which heretofore had merely been released to the atmosphere or improperly buried in landfills. Accordingly, most industries today have undertaken programs and employ expensive absorption systems to prevent undesirable products from escaping from their plants which might otherwise pollute the air, land or water.

The literature is therefore replete with methods, processes, filtering equipment, absorbents, and numerous other recovery and separation systems for preventing the escape of toxic materials into the atmosphere. One of the more popular mediums which has been used to absorb materials, is granular activated carbon. However, more recent developments have been directed to a variety of new absorption materials which have a greater absorption capacity per unit weight, are less expensive and are more easily disposed of, for example, by incineration at a waste-to-energy cogeneration plant.

Attempts have been made recently to employ certain organic polymeric materials to avoid the deficiencies of absorbents, such as activated carbon. These materials are generally produced either as large pellets which are mechanically easy to use but which have very low surface areas and therefore have very limited use in absorbing materials from dilute streams in water or air. Another form in which certain of the newer absorbents are employed is an aggregation of very small spheres. While they have an adequate surface area, the use of the very small spheres suffers from a number of disadvantages for use as absorbents.

First, the absorption media is an aggregates of very small spheres. These aggregates can be broken up by severe pressure or turbulence or abrasion and the resulting particles are so small that they may leave or plug the absorption column or bed.

Second, like the large pellets they have soft segments and are deformable. This softness and the ease of deformation increase as the so called soft segment absorbs more hydrocarbon until the material can become tacky and flow and even liquify in the extreme. This means that under some conditions the bed or column may compact and form blockages or even conglomerates, lose surface area and in general become of relatively little value. This is particularly true if one tries to take the beds to very high loadings or if they are suddenly damaged by a slug of material, that is, high concentrations of hydrocarbon, chlorocarbon and the like, entering the bed.

Third, these copolymers are lower in density than water, and therefore in water usages they will float and must be constrained by filters. Filters in turn can be plugged by fines and soft, larger particles from the bed. Attempts have been made to minimize some of these characteristics and provide some mechanical support to an absorption bed comprised of copolymers by using some sort of harder less compressable spacer material. Activated carbon has been used for this purpose and the composite bed of carbon and copolymer particles is useful in certain practical separations. However, the unfavorable characteristics of the copolymers are only slightly modified by using carbon as spacers. Another disadvantage of the copolymer materials is that they can not be regenerated with heat; in most cases raising the temperature of the saturated hydrocarbon or chlorocarbon saturated hydrocarbon block copolymer bed promotes the softening of the copolymer and in most cases would lead to an aggregation of the bed and destruction of any useful properties. So in general many of these polymer material are not regenerated but are formulated to be disposed of by incineration or as landfill.

These copolymers can be melted and extruded in any sort of film or rod or any other extrusion shape which is desired. The product can be either cut up or formed into absorption material which can be packed in a bed as a sort of fabricated filter device. However, the inate softness of the material when it become loaded with organics would prevent these shapes from having the required rigidity and lack of compressibility and stickiness that is desired except under unusal conditions, that is, where the total amount of hydrocarbon to be absorbed is very low and an efficient filter made of extruded fine diameter fibers of copolymer could be fabricated into an efficient web or composite that would have a high surface area and be capable of absorbing small amounts of hydrocarbons or other contaminants in devices which require very low pressure drops, such as air conditioning systems. Hence, to date the use of copolymer materials as absorbents has not been without its problems.

It has now been found that by using certain elastomeric or hydrocarbon block copolymer materials, as hereinafter defined, a wide variety of chemicals, such as, benzene, naphthalene, toluene, PCB's, xylene, isooctane, vinyl halides, gasoline, deisel fuel, chlorobenzene, perchloroethylene, methyl-t-butyl ether, trichloroethylene, isoprene, and numerous other relatively non-polar compounds whose solubility parameters are close to those of the soft or amorphous block of the hydrocarbon block copolymers, can be separated from gaseous and/or liquid streams with significant reductions in both cost and frequency of absorption media replacement. The use of these elastomeric polymeric materials allows for the reduction in absorption bed size, extended life of the absorption media and environmentally safe disposition of the absorbed material.

It is therefore and object of this invention to provide a method and apparatus for the absorption of non-polar organic molecules from fluids. Another object of this invention is to provide a process for removing undesirable contaminants from gaseous and liquid industrial waste streams. Another object of this invention is to remove gasoline, diesel fuel and other organic contaminants. A further object is to provide a method which is environmentally attractive for the separation of toxic substances from the effluent of chemical processes. A still further object of the invention is to provide substrates, such as fibrous substrates, coated with an absorbent hydrocarbon block copolymer which is highly efficient and selectively in absorbing non-polar organic materials.

These and other objects will be readily apparent to those skilled in the art in light of the teachings herein set forth

SUMMARY OF THE INVENTION

In its broad aspect, the present invention is directed to a method and apparatus for the removal of non-polar organic molecules from fluids, (i.e. liquids and gases), containing such molecules. The method comprises passing the fluids into an absorption zone of a separation system wherein the absorption zone contains, as at least one of the active absorbent materials, a hydrocarbon block copolymer comprised of from about 60 weight percent to about 85 weight percent, preferably from about 65 to about 80 weight percent, based on the total weight of the hydrocarbon block copolymer, of soft amorphous polymeric segments consisting of a polydiene, a poly(lower-alkylene), or a poly(ethylene-lower alkylene) copolymer, such as poly(butadiene), poly(isoprene), poly(ethylene-butylene), poly(ethylene-propylene) copolymer and the like, (the ethylene-alkylene copolymers are preferred over polydienes because of superior oxidation stability), and from about 40 to about 15 weight percent, preferably from about 35 to about 20 weight percent of hard crystalline segments consisting of polystyrene or other crystalline polymer segments, and wherein the hydrocarbon block copolymer has a Brookfield Viscosity as measured on a 25% solution in toluene at 75° F., of from about 1000 to about 10,000 and recovering the fluids free of such molecules or having a substantially lower amount of such molecules in the fluid. The invention also encompasses an apparatus or system within which the method can be conducted.

DETAILED DESCRIPTION OF THE PREFERRED EMBODIMENTS

As used throughout the specification and claims the term "lower-alkylene" refers to alkylene groups, that can also be depicted as -R-, wherein R is a hydrocarbon group and contains from 1 to 6 carbon atoms.

As indicated, the hydrocarbon block copolymers used in the present invention, (also hereinafter sometimes referred to as "elastomeric polymers"), are comprised of at least two segments, a soft segment composed of at least one poly(alkylene) or polydiene and a hard crystalline segment composed of polystyrene, cross-linked polystyrene, or another crystalline polymer segment. The soft segment provides a high surface area for the absorption of the non-polar molecules while the hard segment aids in maintaining the rigidity of the absorbent rubber.

These materials function by absorbing the hydrocarbons, chlorocarbons or other materials into the so-called soft segment which is made up of, for example, of polyethylene units and polypropylene units or copolymers of similar materials, while the structure of the copolymer is maintained by the crystalline polystyrene segments.

The maintenance of a rigid system is essential when the rate of flow of fluid and/or fluid pressure is high so that compaction of the absorbent material does not occur with the resultant decrease in efficiency.

In a preferred embodiment of the invention, the hydrocarbon block copolymer is comprised of about 70 weight percent soft segments consisting of ethylene/butylene units and about 30 weight percent of hard segments consisting of polystyrene. In another embodiment the hydrocarbon block copolymer is comprised of about 70 weight percent soft segments consisting of polypropylene and about 30 weight percent of hard segments consisting of polystyrene. A further embodiment employs a mixture of lower-alkylenes such as ethylene and propylene copolymers. When two or more lower-alkylene units are present, they can occur randomly or as block units.

In a particularly preferred embodiment, the terminal portions of the hydrocarbon block copolymer are comprised of the hard segments. That is, the hydrocarbon block copolymer is comprised of a first segment of polystyrene, a middle segment of one or more poly(lower-alkylenes) and an end segment of polystyrene. However, the hydrocarbon block copolymer itself can also be comprised of alternate blocks of the soft and hard segments.

Hydrocarbon block copolymers comprised of the poly(lower-alkylenes) and polystyrene, are elastomeric polymers prepared by known methods and are commercially available. Polymers of this general type are available from several chemical suppliers including Guardian Environmental Technologies Inc., of Kent, Conn. These are classified in two different categories. One series are those copolymers with an unsaturated softblock while the other series are those with a saturated softblock. Both groups of polymers are elastic, flexible and have a wide range of properties. They are thermoplastic, have good electrical properties and are recyclable. Each molecule of these rubbers consists of a block segment of rubber units and styrene monomer units. The A-B-A type, can be employed in the present invention and are, for example, styrene-ethylene-styrene (SES), styrene-ethylene-propylene-styrene (SEPS), the A-B type (styrene-ethylene) and the like.

It was unexpectedly and surprisingly found that only certain of the hydrocarbon block copolymers could be employed as absorbents in the present invention. These were the the hydrocarbon block copolymers comprised of from about 60 to about 85 weight percent of the alkylene units and from about 40 to about 15 percent, preferably from about 35 to about 20 percent, of the styrene units, based on the total weight of the copolymer. A particularly preferred polymer rubber is the styrene-ethylene/butylene-styrene type (S-EB-S). It was observed that hydrocarbon block copolymers which had styrene contents greater than or less than the above percentages were not satisfactory when employed as the sole absorbent.

As previously indicated, the use of carbon spacers with copolymers offered some improvement. However, in the present invention the use of polymer spacers, offers significant advantage in that unlike carbon or inorganic silca or alumina, the material can be selected of the same density as the hydrocarbon block copolymer and therefore the spacer copolymer particles would be materials such as polystyrene, polyacrylonitrile, or any one of a large number of resin with densities of about 0.9 to 0.95 grams per cubic centimeter. These would be satisfactory and would not segregate in water from the copolymer absorbent.

The copolymers of the present invention can be employed as absorbents in a wide variety of configurations. For example, since the presence of polystyrene in the polymeric network contributes to the rigidity and strength of the polymer, they can be extruded or fabricated into fibers, sheets, pellets, spheres, cylinders, rods, disks or other configurations useful in absorption systems. It is of course desirable to provide the maximum surface area to optimize absorption. Particularly preferred are fibers which can be melt spun into a plurality of linear parallel, solid or hollow fibers, or melt blown into a fluff of intertangled fibers which resemble steel wool or cotton candy. Such configurations provide a high surface area and due to the presence of styrene in the polymer have sufficient rigidity and strength to maintain their configuration under high flow conditions.

It is also possible to simultaneously melt spin two or more fibers, one of which may have a lower concentration of styrene than is desired and the other(s) a higher concentration in order to give sufficient strength and rigidity to the system.

In another embodiment of this invention, the surface area of the polymer rubber can be optimized while conserving the quantity of rubber employed, by placing a thin coating of the polymer rubber on various substrates. For example, a variety of fibers, such as fiberglas can be coated with a thin layer of polymer. If hollow fibers are employed, both the interior and exterior surfaces can be coated. As indicated in Example 1 below, the hydrocarbon block copolymer is easily dissolved in an appropriate solvent which is then applied to the fiber surfaces. Upon evaporation of the solvent, a coating of polymer rubber remains on the fiber. The fibers themselves can be in most any woven or unwoven form. Hence, a variety of textile fabrics can be used as a substrate to support the active absorbent layer. In such instances, the hydrocarbon block copolymer is coated on the fibers in an amount such that the ratio of the coating thickness to the diameter of the fiber is about 0.25 to about 0.5.

Although reference was made earlier to fabricating the entire polymer rubber by itself into a variety of configurations, it is also possible to coat inert substrates having the same configuration, such as rods, cylinders, disks, spheres and the like.

In practice, it has also been found that when the hydrocarbon block copolymer is coated on fibers the ratio of the coating thickness to the diameter of the fiber is about 0.25 to about 0.5. As indicated, the fibers which are used as a substrate upon which the rubber is coated can be most any inert material which would have no adverse effects under the absorption conditions. Such substrates include fibers such as fiberglass, alumina, carbon and certain spun organic polymer fibers.

Accordingly, the copolymers of the present invention can be coated on a variety of substrates, either from solution or from a melt to give materials which now will vary in their absolute density relative to water and which depending on the substrate may be fabricated and shaped into a variety of configurations. However, if the hydrocarbon block copolymers of the present invention are used, simply coating a copolymer onto substrates, such as, alumina granules, silica granules, fibers, surfaces such as paper, textiles metal foils and the like, will not provide a satisfactory absorbent. In general, such materials will have surfaces which soften and become compressible and sticky and in the extreme will flow as they absorb hydrocarbons and chlorocarbons and similar materials. However, using the copolymers of the present invention on such a supporting surface does lend the absorption bed or absorption filter constructed from these materials rigidity and stability.

It has been discovered that when the coatings on the substrates are less than a certain minimum thickness that in addition to the rigidity imparted by the substrate the surface energy of the substrate and the copolymer makes the copolymer mechanically act as if it were harder, less compressible and with less tendency to adhere to the other copolymer surfaces in the absorption bed.

For coating on metal foils, plastic sheets, and textiles the thickness of the copolymer coating should not exceed one millimeter. In coarsely woven textile substrates, the coating should be no greater than half the diameter of the fibers which make up the textile composite.

In coating fibers which could be fiberglas or carbon or any other rigid non-soluble or sparingly soluble polymer such as a cross linked polystyrene whether the material is coated on or coextruded with the carrier fiber, the thickness of the copolymer layer should be no greater than the radiis of the supporting fiber. When coating solid particle for use in a conventional absorption bed such as silica, silica alumina and other inert minerals or plastics, the carrier particles should be no smaller than about 3 mm. in average diameter. The average coating thickness on the smallest particles used should not exceed about 0.5 mm in depth. If the support particle sizes are significantly larger than the minimum thicker polymer coatings (up to about 1 mm) can be use while retaining the improved properties on the surface of the solid support.

All these configurations, sheets, papers and metal foils, textiles etc. coextruded or coated fibers and coated particles all share the improved character that are required to produce a practical absorption medium. These materials maintain their shape during use, they have a very much diminished tendency to agglomerate, through touching, they, maintain their good structural characteristics even when loaded with absorption material and unlike the copolymer particles themselves, can in many cases be regenerated by use of hot air without destroying the structure of the absorbent bed or device.

Copolymer coated fibers can be fabricated in a variety of kinds of filters, and devices and filtration devices either by fabricating these devices from the coated rubber or constructing them of bare fibers and coating the entire fibrous array with copolymer rubber. Paper foil or fabric coated copolymer materials can be fabricated into many different kinds of filters and absorption arrays.

The following examples are illustrative of the invention.

EXAMPLE 1

Absorption of Isooctane

Glass fibers are coated having an average diameter of 0.5 mm are coated with a hydrocarbon block copolymer consisting of 70 per cent by weight of soft polymer segments, that is an ethylene/propylene copolymer and 30 per cent polystyrene hard segments by weight from a concentrated solution of the material in toluene. The fiber coating has an average thickness of 0.2 mm determined by weight average on the absorbed fiber after the solvent has been driven off. The coated fibers are cut to an average 1 cm in length are used to pack and absorption column of 2 cm in diameter and 5 cm in height. Thereafter, a solution of an aqueous stream containing 100 parts per million of isooctane, is passed thru the column with an average residence time of 5 minutes. Analysis of the effulent from the column shows that more that 99 per cent of the isooctane is being removed per pass. The experiment is continued until by calculation an amount of isooctane equal to twice the weight of the copolymer of the composite fiber has been absorbed. At this point the column is still removing 98 per cent of the isooctane in the aqueous stream. Moveover, the column has not changed significantly in mechanical appearance or characteristics.

EXAMPLE 2

Absorption of Vinyl Chloride

In a similar experiment with the aqueous media containing 50 ppm of vinyl chloride a similar column removed about 80 per cent of the vinyl chloride per pass with the total being about equal to the weight of the coplymer component of the fiber. In this case after the experiment is over, the column is emptied of the water and warm air passed through a cooling column and then through a dry ice cooled cold trap, the bulk of the absorbed vinyl chloride is desorbed and can be recovered from the cold trap.

As indicated, the invention is also directed to an apparatus or system for the removal of non-polar organic molecules from fluids containing such molecules. The apparatus or system is comprised of in combination, inlet means for passing said fluids through a separation zone which contains at least one of the active absorbent materials, which is a hydrocarbon block copolymer comprised of about 70 weight percent of soft polymeric segments consisting of at least one poly(lower alkylene), and about 30 weight percent of hard segments consisting of polystyrene, the hydrocarbon block copolymer having a measured Brookfield Viscosity of from about 1000 to about 10,000, and exit means for recovery of said fluids free of such molecules.

Either the raw polymeric absorbent particles or polymers coated onto a suitable support as described above can be employed in porous booms or blankets to remove surface contamination from streams and process water outfalls. The contaminants removed include the classes of compounds described above and polysiloxanes and polysiloxane derivatives.

In addition, the raw polymeric absorbent particles or the supported polymeric absorbents can be used to remove chlorosilanes from spills onto solid surfaces or from vapor streams. Remarkably the absorbed chlorosilanes do not react with atmospheric water to produce HCl, a reaction which is very rapid with clorosilanes themselves.

Although the invention has been illustrated by the preceding examples, it is not to be construed as being limited to the materials employed therein, rather the invention is directed to the generic area as hereinbefore disclosed. Various modifications and embodiments can be made without departing from the spirit or scope thereof.

What is claimed is:

1. A method for the removal of non-polar organic molecules contained in fluids which comprises passing said fluids through a separation system which contains as at least one of the active absorbent materials, a hydrocarbon block copolymer comprised of from about 65 weight percent to about 80 weight percent, based on the weight of the hydrocarbon block copolymer, of soft polymeric segments consisting of at least one poly(lower alkylene), and from about 35 weight percent to about 20 weight percent, based on the weight of the hydrocarbon block copolymer, of hard segments consisting of polystyrene, the hydrocarbon block copolymer having a Brookfield Viscosity as determined on a 25% solution at 75° F., of from about 1000 to about 10,000, and recovering from the separation system, fluids free of, or containing a substantially lesser amount of said non-polar molecules.

2. The method of claim 1 wherein the hydrocarbon block copolymer is comprised of from about 65 to about 80 weight percent soft segments consisting of an ethylene, butylene copolymer and from about 35 to about 20 weight percent of hard segments consisting of polystyrene.

3. The method of claim 1 wherein the hydrocarbon block copolymer is comprised of from about 65 to about 80 weight percent soft segments consisting of polypropylene and from about 35 to about 20 weight percent of hard segments consisting of polystyrene.

4. The method of claim 1 wherein the hydrocarbon block copolymer is comprised of from about 65 to about 80 weight percent of soft segments consisting of a copolymer of ethylene and propylene and from about 35 to about 20 weight percent of hard segments consisting of polystyrene.

5. The method of claim 2 wherein the terminal portions of the hydrocarbon block copolymer is comprised of the hard polystyrene segments.

6. The method of claim 2 wherein the hydrocarbon block copolymer is comprised of random blocks of the soft and hard segments.

7. The method of claim 2 wherein the soft segment of the hydrocarbon block copolymer is comprised of poly(butadiene) or poly(isoprene).

8. The method of claim 2 wherein the hydrocarbon block copolymer is comprised of a first segment of polystyrene, a middle segment of poly(lower-alkylene) and an end segment of polystyrene.

9. The method of claim 1 wherein the fluid is a gas.

10. The method of claim 1 wherein the fluid is a water or a polar fluid.

11. The method of claim 10 wherein the fluid is ethylene glycol or a mixture of water and alcohol.

12. The method of claim 1 wherein the separation system containing the hydrocarbon block copolymers also contains spacers which have essentially the same density as the copolymers.

13. The method of claim 12 wherein the spacers are selected from the group consisting of polystyrene, polyacrylonitrile, crystalline polypropylene, crosslinked polypropylene, crosslinked polystyrene, crosslinked polyacrylates, high density polyethylene, and polyethylene terephthalate.

14. The method of claim 1 wherein the absorbent material is in the form of pellets coated with the hydrocarbon block copolymer.

15. The method of claim 1 wherein the absorbent material is in the form of a sheet coated with the hydrocarbon block copolymer.

16. The method of claim 1 wherein the absorbent material is in the form of spheres coated with the hydrocarbon block copolymer.

17. The method of claim 1 wherein the absorbent material is in the form of fibers coated with the hydrocarbon block copolymer.

18. The method of claim 15 wherein the hydrocarbon block copolymer is coated on the fibers in an amount such that the ratio of the coating thickness to the diameter of the fiber is from about 0.25 to about 0.5.

19. The method of claim 15 wherein the fibers are comprised of at least one member selected from the group consisting of fiberglass, alumina, carbon and spun organic polymer fibers and the fibers are melt blown to form a randomly intertwined structure.

20. An apparatus for the removal of non-polar organic molecules from fluids containing the molecules comprised of in combination, inlet means for passing said fluids through a separation zone which zone contains as at least one active absorbent material, a hydrocarbon block copolymer comprised of from about 65 weight percent to about 80 weight percent, based on the weight of the hydrocarbon block copolymer, of soft polymeric segments consisting of at least one poly(lower alkylene), and from about 35 weight percent to about 20 weight percent, based on the weight of the hydrocarbon block copolymer, of hard segments consisting of polystyrene, the hydrocarbon block copolymer having a Brookfield Viscosity as determined on a 25% solution at 75° F., of from about 1000 to about 10,000, and exit means for recovering from the separation zone, fluids free of, or containing a substantially lesser amount of said non-polar molecules.

* * * * *